(12) United States Patent
Suzuki (10) Patent No.: US 9,067,432 B2
(45) Date of Patent: Jun. 30, 2015

(54) PRINTER APPARATUS AND LAMINATING METHOD

(71) Applicant: Sony Corporation, Tokyo (JP)

(72) Inventor: Yasuo Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/709,678

(22) Filed: Dec. 10, 2012

(65) Prior Publication Data

US 2013/0093826 A1 Apr. 18, 2013

Related U.S. Application Data

(63) Continuation of application No. 12/327,903, filed on Dec. 4, 2008.

(30) Foreign Application Priority Data

Dec. 5, 2007 (JP) .................. 2007-314828

(51) Int. Cl.
*B41J 2/36* (2006.01)
*B32B 38/14* (2006.01)

(52) U.S. Cl.
CPC .. *B41J 2/36* (2013.01); *B32B 38/14* (2013.01); *B41J 2202/33* (2013.01)

(58) Field of Classification Search
CPC .............. B41J 2/36; B41J 2/365; B41J 2/362; B41J 2/355; B41J 2/3558; B41J 2202/33; B32B 38/14; B32B 38/145; B32B 41/00
USPC ........... 156/64, 277; 347/190, 191, 194, 188; 399/342
See application file for complete search history.

(56) References Cited

U.S. PATENT DOCUMENTS 6,092,942 A 7/2000 Koichi
6,619,869 B1 9/2003 Huang
(Continued)

FOREIGN PATENT DOCUMENTS

JP 02-117847 5/1990
JP 11-314445 11/1999
(Continued)

OTHER PUBLICATIONS

European Search Report corresponding to European Serial No. 08020285 dated Sep. 21, 2009.

*Primary Examiner* — George Koch
(74) *Attorney, Agent, or Firm* — Dentons US LLP (57) ABSTRACT

A printer apparatus including a printing-medium conveying unit conveying a printing medium, a sheet conveying unit conveying a thermal transfer sheet having an image protecting layer to be thermally transferred onto an image formed on the printing medium, a thermal head with heating elements linearly arranged in a direction orthogonal to a conveyance direction of the printing medium, and a control unit driving and controlling the thermal head. For selectively applying different amounts of thermal energy to the heating elements to form an uneven pattern on the image protecting layer thermally transferred onto the image on the printing medium, the control unit randomly divides a row of the heating elements into heating element groups each including at least two adjacent heating elements, applies the same amount of thermal energy to heating elements in the same heating element group, and applies different amounts of thermal energy to adjacent heating element groups.

2 Claims, 7 Drawing Sheets

(56) References Cited

U.S. PATENT DOCUMENTS

2002/0097315 A1* 7/2002 Aroneo et al. ............. 347/215
2003/0107639 A1 6/2003 Field

FOREIGN PATENT DOCUMENTS

| | | |
|---|---|---|
| JP | 2000-000987 | 1/2000 |
| JP | 3021490 | 1/2000 |
| JP | 3185254 | 5/2001 |
| JP | 2005-271321 | 10/2005 |
| JP | 2006-182012 | 7/2006 |
| JP | 3861293 | 10/2006 |
| JP | 2007-118394 | 5/2007 |

* cited by examiner

PRINTER APPARATUS AND LAMINATING METHOD

CROSS REFERENCES TO RELATED APPLICATIONS

This application is a division of U.S. patent application Ser. No. 12/327,903, entitled "PRINTER APPARATUS AND LAMINATING METHOD," filed on Dec. 4, 2008, the entirety of which is incorporated herein by reference to the extent permitted by law. The present application claims priority to Japanese Patent Application JP 2007-314828 filed in the Japanese Patent Office on Dec. 5, 2007, the entirety of which is also incorporated herein by reference to the extent permitted by law.

BACKGROUND OF THE INVENTION

1. Field of the Invention

The present invention relates to a printer apparatus and a laminating method for laminating, with an image protecting layer by thermal transfer, a printing medium having an image formed thereon; forming an uneven pattern on the image protecting layer; and thus providing a glossy textured finish similar to that of a silver halide photograph.

2. Description of the Related Art

Examples of printing methods include a thermal transfer printing method in which an image is formed by thermally transferring color materials, such as dyes, from a thermal transfer sheet onto a recording medium. For protecting the image formed on the recording medium, the thermal transfer printing method further involves formation of a transparent image-protecting layer on the image. The thermal transfer printing method uses a density gradation method which allows free control of image density. Therefore, it is possible to provide a high-quality image close to a silver halide photograph, which is excellent in gradation characteristic and color reproducibility.

The thermal transfer printing method is expected to provide not only a high-quality image close to a silver halide photograph, but also a finish close to that of a silver halide photograph. Typically, silver halide photographs are available in glossy and textured finishes, and users select one of them according to their preferences. Recently, however, there have been demands for a printed material with a surface that is both glossy and textured.

Examples of techniques for achieving a textured finish using the foregoing thermal transfer printing method are disclosed in Japanese Patent No. 3185254, Japanese Unexamined Patent Application Publication No. 2006-182012, Japanese Patent No. 3021490, and Japanese Patent No. 3861293.

Japanese Patent No. 3185254 discloses a technique in which, after embossing (like texturing) is performed using an embossing roll or the like on a polyolefin resin layer on the surface of base paper, the surface roughness of printing paper coated with an absorbing layer is defined. Such printing paper, which originally has high surface roughness, will not firmly adhere to an ink ribbon and heating elements of a printer head during printing. This may cause occurrence of unprinted spots on the printing paper after printing, and thus may cause degradation in print quality.

Japanese Unexamined Patent Application Publication No. 2006-182012 discloses a technique in which, after transfer of an image protecting layer to printing paper, the surface of the image protecting layer is embossed under heating conditions by an embossing roll with surface irregularities, so that a matte pattern is formed on the resulting surface after printing. However, if the printing paper is embossed under non-heating conditions, cracks may be produced in the image protecting layer on the surface of the printing paper or in an absorbing layer, and thus lightfastness of the printing paper may be degraded. To prevent such cracks, it is necessary to emboss the printing paper while heating it. This involves heating of the embossing roll to at least a glass transition temperature (Tg) of the image protecting layer (e.g., at least about 100° C.). Additionally, it is necessary to apply embossing pressure to the printing paper. This involves use of a large embossing device, which may not be easily accommodated in the main body of the printer. Therefore, it is difficult to form an uneven pattern on the image protecting layer in a short time after printing.

Japanese Patent No. 3021490 discloses a technique in which, during formation of an image protecting layer, the amount of thermal energy continuously applied to heating elements is varied continuously or stepwise every predetermined distance. Thus, regions of different gloss levels can be arranged in any order on the surface of the image protecting layer. With this method, it becomes not necessary to provide a special device inside the printer. Additionally, this method allows the user to select a desired finish, such as a glossy finish or a textured finish, and there is little difference in printing time between finishes.

Japanese Patent No. 3861293 discloses a technique where a memory in which an uneven pattern is recorded is provided, uneven-pattern data for each printing line is generated during transfer of an image protecting layer, and the amount of voltage applied to a thermal transfer head is varied, so that a desired uneven pattern is formed.

However, a method for forming such an uneven pattern is only described as "regions of different heights are arranged in any order on the surface of the image protecting layer" in Japanese Patent No. 3021490, and "random pattern data serving as a minimum unit can be generated by any method" in Japanese Patent No. 3861293. That is, there has been no specific discussion about a method for forming an uneven pattern for providing a glossy textured finish.

SUMMARY OF THE INVENTION

The present invention has been made in view of the problems described above. It is desirable to provide a printer apparatus and a laminating method in which, by specifying how to apply thermal energy to heating elements of a thermal head during transfer of an image protecting layer, it is possible to form an uneven pattern highly reproducible on printing paper and provide a printed material having a textured finish close to that of a silver halide photograph.

According to an embodiment of the present invention, there is provided a printer apparatus including printing-medium conveying means for conveying a printing medium, sheet conveying means for conveying a thermal transfer sheet having at least an image protecting layer to be thermally transferred onto an image formed on the printing medium, a plurality of heating elements, a thermal head in which the heating elements are linearly arranged in a direction orthogonal to a conveyance direction in which the printing medium is conveyed, and control means for driving and controlling the thermal head. For selectively applying different amounts of thermal energy to the heating elements in the thermal head so as to form an uneven pattern on the image protecting layer thermally transferred onto the image formed on the printing medium, the control means randomly divides a row of the heating elements in the thermal head into heating element groups each including at least two adjacent heating elements, applies the same amount of thermal energy to heating elements included in the same heating element group, and applies different amounts of thermal energy to respective adjacent heating element groups.

According to another embodiment of the present invention, there is provided a laminating method for forming, by selectively applying different amounts of thermal energy to heating elements in a thermal head, an uneven pattern on an image protecting layer thermally transferred onto an image formed on a printing medium by thermal transfer. The laminating method includes the steps of randomly dividing, for each printing line of the printing medium, a row of the heating elements in the thermal head into heating element groups each including at least two adjacent heating elements; applying the same amount of thermal energy to heating elements included in the same heating element group; and applying different amounts of thermal energy to respective adjacent heating element groups.

According to the embodiments of the present invention described above, a row of the heating elements in the thermal head is randomly divided into heating element groups each including at least two adjacent heating elements, the same amount of thermal energy is applied to heating elements included in the same heating element group, and different amounts of thermal energy are applies to respective adjacent heating element groups. Thus, it is possible to form an uneven pattern highly reproducible on printing paper and provide a printed material having a textured finish close to that of a silver halide photograph.

DESCRIPTION OF THE PREFERRED EMBODIMENTS

Hereinafter, a dye-sublimation printer apparatus and a laminating method by which the printer apparatus laminates a printed material will be described with reference to the drawings.

Figure 1:
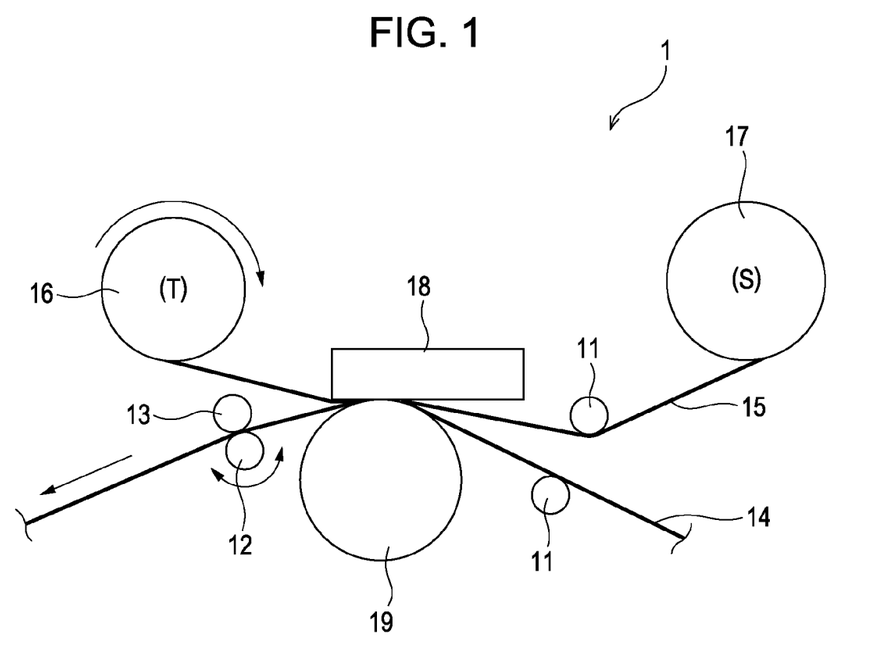
FIG. 1 illustrates a configuration of a printer apparatus according to an embodiment of the present invention.

FIG. 1 illustrates a configuration of a printer apparatus 1 according to an embodiment of the present invention. As illustrated, during printing, a printing medium 14, such as printing paper, is guided by a guide roller 11, conveyed, and introduced into the nip between a capstan 12 and a pinch roller 13. The printer apparatus 1 has a cartridge containing a thermal transfer sheet. When a take-up reel 16 is rotated, a thermal transfer sheet 15 is conveyed from a supply reel 17 to the take-up reel 16. At a printing position where ink on the thermal transfer sheet 15 is transferred to the printing medium 14, a thermal head 18 and a platen roller 19 are disposed opposite each other. From the thermal transfer sheet 15 pressed at a predetermined pressure by the thermal head 18, color materials, such as dyes, are sublimated and thermally transferred to the printing medium 14.

Figure 2:
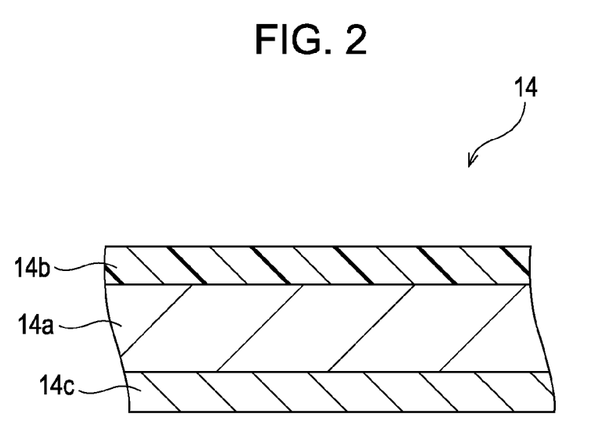
FIG. 2 is a cross-sectional view illustrating a main part of a recording medium used in the printer apparatus of FIG. 1.

FIG. 2 is a cross-sectional view of a main part of the printing medium 14. As illustrated, the printing medium 14 includes a base 14a, an absorbing layer 14b on one surface of the base 14a, and a back layer 14c on the other surface of the base 14a. The base 14a is formed of paper (pulp), polypropylene (PP), polyethylene terephthalate (PET), or the like. The absorbing layer 14b absorbs and holds dyes transferred from the thermal transfer sheet 15. The absorbing layer 14b is formed of, for example, a thermoplastic resin, such as an acrylic resin, polyester, polycarbonate, or polyvinyl chloride. The back layer 14c reduces friction between the printing medium 14 and the guide roller 11, and between the printing medium 14 and the platen roller 19.

Figure 3:
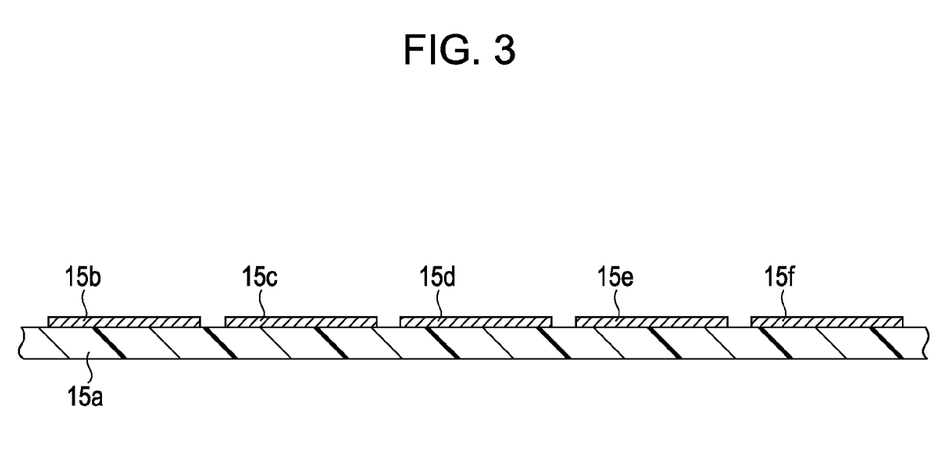
FIG. 3 is a cross-sectional view illustrating a thermal transfer sheet used in the printer apparatus of FIG. 1.

FIG. 3 is a cross-sectional view of the thermal transfer sheet 15. As illustrated, the thermal transfer sheet 15 includes a base 15a, and color material layers 15b, 15c, 15d, and 15e and an image protecting layer 15f on one surface of the base 15a. The base 15a is a synthetic resin film, such as a polyester film or a polystyrene film. The color material layers 15b, 15c, 15d, and 15e are formed of color materials (e.g., dyes or pigments) of yellow, magenta, cyan, and black, respectively, for image formation, and a thermoplastic resin. The image protecting layer 15f is formed of, for example, the same thermoplastic resin as that of the color material layers 15b, 15c, 15d, and 15e. The color material layers 15b, 15c, 15d, and 15e and the image protecting layer 15f are formed on the base 15a as a set, and frame-sequentially arranged across the length of the thermal transfer sheet 15. The color material layers 15b, 15c, 15d, and 15e are sublimated and thermally transferred to the absorbing layer 14b of the printing medium 14 when thermal energy corresponding to image data to be printed is applied thereto by the thermal head 18.

More specifically, the color material layers 15b, 15c, 15d, and 15e are formed by dispersing sublimation dyes or thermally diffusible dyes into a cellulosic resin (e.g., methylcellulose resin, ethyl cellulose resin, hydroxyethyl cellulose resin, hydroxypropyl cellulose resin, or cellulose acetate resin), a vinyl resin (e.g., polyvinyl alcohol resin, polyvinyl butyral resin, polyvinyl acetoacetal resin, polyvinyl acetate resin, or polystyrene resin), or one of various urethane resins.

The image protecting layer 15f is formed of a thermoplastic resin, such as a polyester resin or a cellulose ester resin. For better image preservation, an ultraviolet absorbent, a light stabilizer, an antioxidant, or the like may be added to the thermoplastic resin.

The image protecting layer 15f is thermally transferred onto an image formed by transferring the color material layers 15b, 15c, 15d, and 15e to the printing medium 14. By applying thermal energy from the thermal head 18 to the surface of the image protecting layer 15f thermally transferred to the printing medium 14, micro-irregularities are formed on the surface of the image protecting layer 15f and thus, a textured surface of the printing medium 14 is made.

The thermal transfer sheet 15 may have any structure, as long as it includes the image protecting layer 15f. For example, the thermal transfer sheet 15 may include only a black color material layer and the image protecting layer 15f. When the image protecting layer 15f is to be thermally transferred onto the printing medium 14 on which an image has already been printed by another printer or the like, it is only necessary that the thermal transfer sheet 15 include the image protecting layer 15f.

Figure 4:
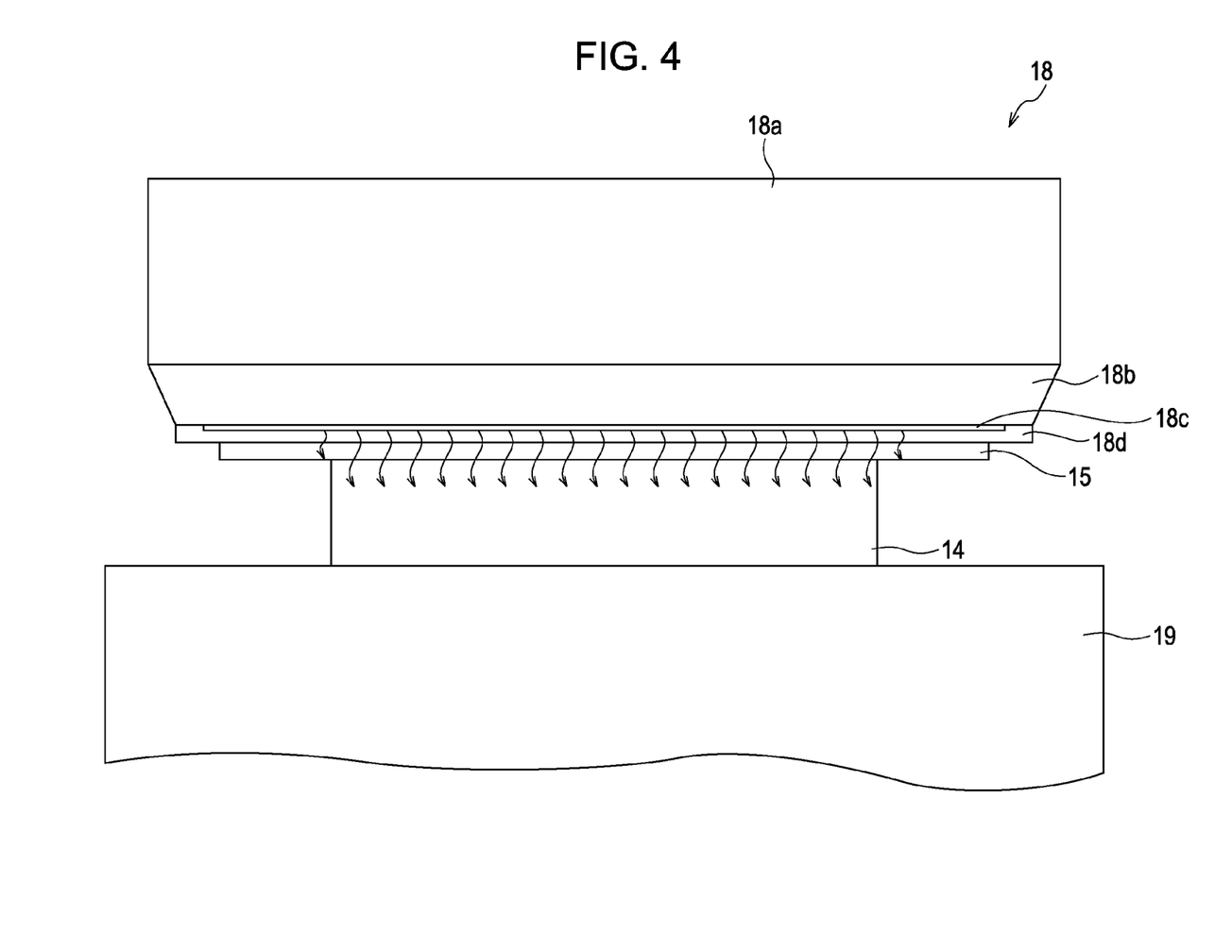
FIG. 4 is a front view illustrating a thermal head of the printer apparatus of FIG. 1.

FIG. 4 is a front view of the thermal head 18. As illustrated, the thermal head 18 includes a ceramic substrate 18a, a glaze layer 18b, heating elements 18c, and a protecting layer 18d. The heating elements 18c, such as heating resistors, are linearly arranged under the ceramic substrate 18a, with the glaze layer 18b interposed between the ceramic substrate 18a and the heating elements 18c. The protecting layer 18d for protecting the heating elements 18c is disposed under the heating elements 18c. The ceramic substrate 18a is excellent in heat releasing characteristic and thus is capable of preventing heat from accumulating in the heating elements 18c. To bring the heating elements 18c into contact with the thermal transfer sheet 15 and the printing medium 14, the glaze layer 18b allows the heating elements 18c to protrude toward the thermal transfer sheet 15 and the printing medium 14. At the same time, the glaze layer 18b serves as a buffer layer to prevent heat of the heating elements 18c from being excessively absorbed in the ceramic substrate 18a. The thermal head 18 causes the heating elements 18c to heat, sublimate, and transfer, line-by-line, the color materials on the thermal transfer sheet 15 onto the printing medium 14, the thermal transfer sheet 15 being interposed between the thermal head 18 and the printing medium 14.

Figure 5:
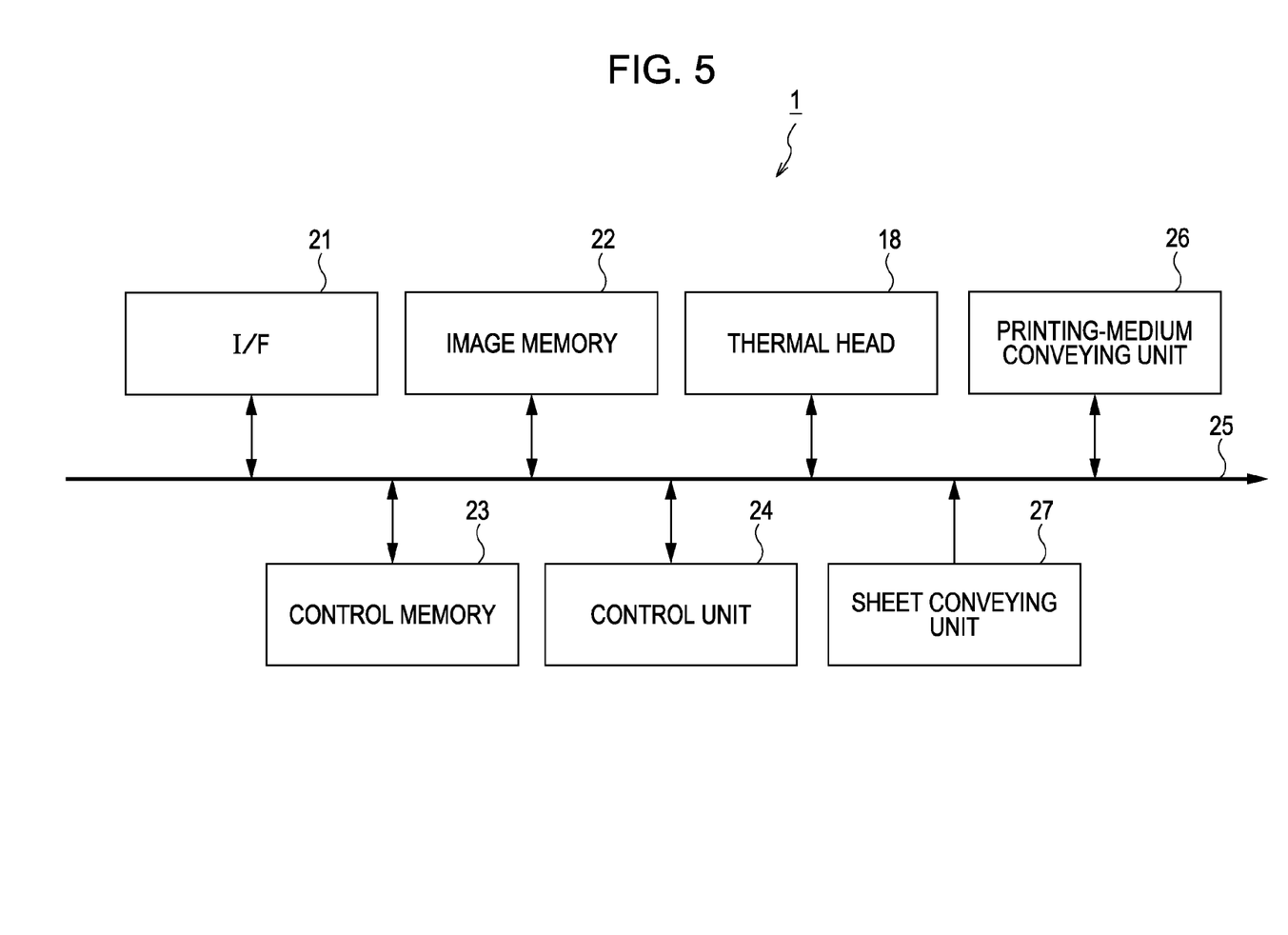
FIG. 5 is a block diagram illustrating the printer apparatus of FIG. 1.

FIG. 5 illustrates a circuit configuration of the printer apparatus 1 structured as described above. As illustrated, in the printer apparatus 1, an interface (hereinafter simply referred to as I/F) 21 through which image data to be printed is input, an image memory 22 for storing the image data input through the I/F 21, a control memory 23 for storing a control program and the like, and a control unit 24 that controls the overall operation of the thermal head 18 and the like are connected to one another via a bus 25. Other components connected to the bus 25 include a printing-medium conveying unit 26 and a sheet conveying unit 27. The printing-medium conveying unit 26 includes the capstan 12 for conveying the printing medium 14 from a paper feeding unit to a paper ejecting unit, and a motor serving as a drive source for the capstan 12. The sheet conveying unit 27 includes the thermal head 18, the take-up reel 16 for conveying the thermal transfer sheet 15, and a motor serving as a drive source for the take-up reel 16. The printing-medium conveying unit 26 and the sheet conveying unit 27 are also controlled by the control unit 24.

Components connected to the I/F 21 include a display apparatus, such as a liquid crystal display (LCD) or a cathode-ray tube (CRT), which displays an image to be printed; and an electric apparatus, such as a recording and/or reproducing apparatus, to which a recording medium is attached. For example, when the display apparatus displays a moving image, still image data selected by the user is input. Also, when the recording and/or reproducing apparatus is connected to the I/F 21, still image data recorded in the recording medium, such as an optical disk or an IC card, is input. The electric apparatus is connected to the I/F 21 via wired or wireless connection according to a standard, such as a universal serial bus (USB) standard, the Institute of Electrical and Electronics Engineers (IEEE) 1394 standard, or the Bluetooth standard.

The image memory 22 is capable of storing at least one sheet of image data. Image data to be printed is input through the I/F 21 to the image memory 22, and temporarily stored therein.

The control memory 23 stores a control program for controlling the overall operation of the printer apparatus 1. The control unit 24 controls the overall operation according to the control program stored in the control memory 23.

The control memory 23 stores uneven-pattern data for randomly dividing a row of the linearly-arranged heating elements 18c of the thermal head 18 into heating element groups each including at least two adjacent heating elements 18c, applying the same amount of thermal energy (first amount of thermal energy) to all heating elements 18c included in the same heating element group (first heating element group), and applying a second amount of thermal energy different from the first amount of thermal energy to all heating elements 18c included in a heating element group (second heating element group) adjacent to the first heating-element group. Then, according to this uneven-pattern data stored in the control memory 23, the thermal head 18 is driven for thermal transfer of the image protecting layer 15f of the thermal transfer sheet 15 onto an image formed on the printing medium 14.

Figure 6:
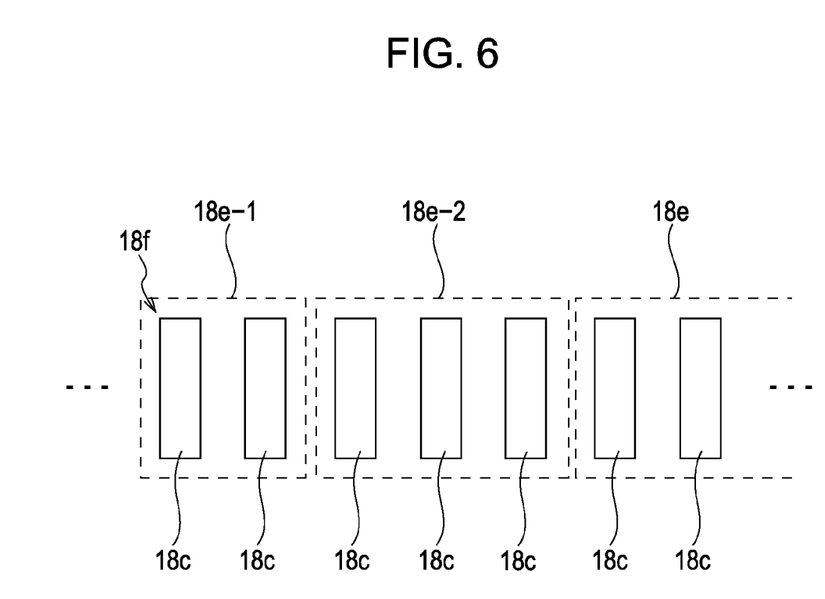
FIG. 6 illustrates heating element groups each including at least two adjacent heating elements.

Specifically, in the example of FIG. 6, uneven-pattern data is generated such that a heating element row 18f including the linearly-arranged heating elements 18c is randomly divided into heating element groups 18e, each group including at least two adjacent heating elements 18c corresponding to two adjacent pixels in a row. A heating element group 18e-1 includes two heating elements 18c corresponding to two adjacent pixels in a row, while a heating element group 18e-2 includes three heating elements 18c corresponding to three adjacent pixels in a row. More than three adjacent pixels in a row may be used as a minimum unit.

According to experiments carried out by the inventor of the present invention, in a pattern lying in a direction (i.e., a direction in which the heating elements 18c are linearly arranged) orthogonal to a printing direction of a random pattern for forming an uneven pattern on the printing medium 14, if the amount of thermal energy applied to one heating element 18c (first heating element) is different from that applied to the adjacent heating elements 18c (second and third heating elements) on both sides of the first heating element, it is difficult to form a raised or recessed portion corresponding to the first heating element on the printing medium 14. In particular, when the amount of thermal energy applied to the first heating element is different from that applied to the second and third heating elements on both sides thereof, if a larger amount of thermal energy is applied to the first heating element to form a glossy surface on a matte surface, the first heating element is very susceptible to the thermal energy applied to the second and third heating elements on both sides. As a result, substantially no print pattern corresponding to the first heating element can be formed. If an uneven pattern containing a number of such print patterns is produced, the resulting printed material appears to be entirely matte based on visual observation, since raised and recessed portions are not clearly formed. That is, a printed material with a textured surface is not produced. Thus, in an embodiment of the present invention, uneven-pattern data stored in the control memory 23 is configured such that the same amount of thermal energy is applied to at least two adjacent heating elements 18c.

Additionally, uneven-pattern data stored in the control memory 23 is configured such that the same amount of thermal energy is applied to each heating element 18c of the thermal head 18 in at least two adjacent printing lines in a conveyance direction of the printing medium 14. Thus, the image protecting layer 15f thermally transferred from the thermal transfer sheet 15 onto an image formed on the printing medium 14 has an uneven pattern with raised and recessed portions clearly defined.

For heating the heating elements 18c of the thermal head 18 according to uneven-pattern data, if two different amounts of thermal energy, "large thermal energy" and "small thermal energy" (the amount of each thermal energy can be any amount), are applied to the heating elements 18c for thermal transfer of the image protecting layer 15f, a visually distinctive uneven pattern can be formed on the image protecting layer 15f. Here, if a difference between the amounts of "large thermal energy" and "small thermal energy" is maximized, or if a difference between the amounts of "large thermal energy" and "small thermal energy" is set such that the degree of surface roughness formed by application of the "large thermal energy" and "small thermal energy" is minimized, it is possible to provide a glossy textured finish. For example, when a predetermined amount of thermal energy is applied to form a recessed portion, the bottom surface of the recessed portion can be smoothed by applying a larger amount of thermal energy than the predetermined amount. Thus, the degree of surface roughness formed by application of the "large thermal energy" and "small thermal energy" can be reduced.

When the uneven-pattern data stored in the control memory 23 is configured such that two different amounts of thermal energy are applied to the heating elements 18c for thermal transfer of the image protecting layer 15f onto an image formed on the printing medium 14, if, in the uneven pattern formed on the printing medium 14, an area ratio between recessed and raised portions corresponding to the respective amounts of thermal energy is in the 4:6 to 6:4 range, a great visual effect of a textured surface can be achieved. If the area ratio is outside the above-described range, the uneven pattern on the printing medium 14 is hardly recognizable. Thus, the entire surface of the printing medium 14 gives the impression of being glossy or matte, and the visual effect of the textured surface is very small.

According to the foregoing embodiment of the present invention, the uneven-pattern data stored in the control memory 23 is configured as described above. Thus, micro-irregularities are formed on the surface of the image protecting layer 15f, so that a textured surface of the image protecting layer 15f is made.

The control unit 24 controls the overall operation according to the control program stored in the control memory 23. For example, the control unit 24 controls the thermal head 18 according to an image to be printed. After an image is formed on the printing medium 14, the control unit 24 controls the thermal head 18 such that the image protecting layer 15f is thermally transferred onto the image formed on the printing medium 14. For thermal transfer of the image protecting layer 15f, the control unit 24 drives and controls the heating elements 18c of the thermal head 18 according to uneven-pattern data stored in the control memory 23. Thus, an uneven pattern is formed on the surface of the image protecting layer 15f thermally transferred onto the image.

Next, a printing operation of the printer apparatus 1 having the foregoing configuration will be described. According to the program stored in the control memory 23, the control unit 24 drives and controls the printing-medium conveying unit 26 to convey the printing medium 14 to a printing start position at a position of the thermal head 18. Additionally, the control unit 24 drives and controls the sheet conveying unit 27 to convey the thermal transfer sheet 15 such that the yellow color material layer 15b, the magenta color material layer 15c, the cyan color material layer 15d, the black color material layer 15e, and the image protecting layer 15f are thermally transferred, in this order, onto the printing medium 14. While conveying the printing medium 14 at a high speed, the control unit 24 drives the thermal head 18 according to image data to be printed so as to thermally transfer the color material layers 15b, 15c, 15d, and 15e in the order of yellow, magenta, cyan, and black at densities corresponding to the image data, thereby forming an image on the printing medium 14. Then, while conveying the printing medium 14 at a speed lower than that during the image formation, the control unit 24 thermally transfers the image protecting layer 15f onto the image formed. At the same time, the control unit 24 forms micro-irregularities on the surface of the transferred image protecting layer 15f according to the uneven-pattern data described above, so that a textured surface of the image protecting layer 15f is made.

Embodiments

First, there will be described specifications of a printer apparatus that produces printed materials to be evaluated. The printer apparatus used was capable of thermally transferring an image onto the printing medium 14 using a thermal head, and also thermally transferring the image protecting layer 15f onto the printing medium 14. Specifically, a printer, UP-D75, produced by Sony Corporation was used. The printing resolution of this printer is 300 dpi, while the width of one heating element and the line pitch in the printing direction of this printer are about 85 μm.

Embodiment 1

Figure 7:
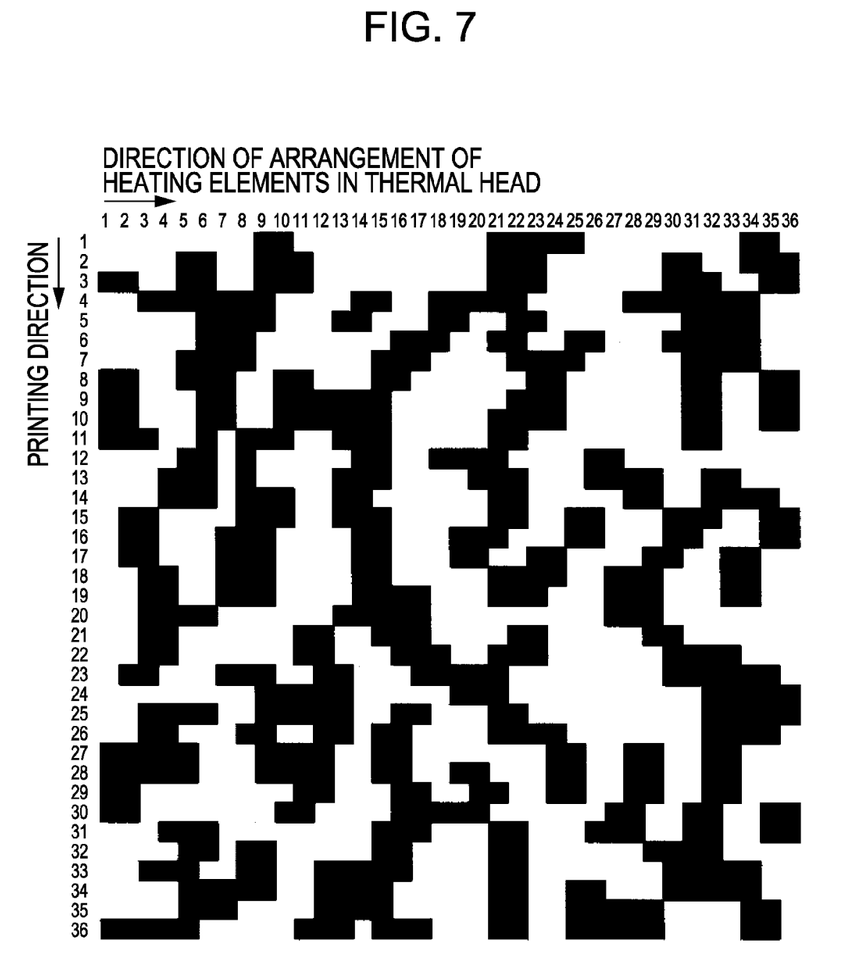
FIG. 7 illustrates an uneven pattern according to Embodiment 1 of the present invention.

A process of generating uneven-pattern data will be described with reference to FIG. 7. In a 1-row by 36-column array of pixels, 2 adjacent pixels in a row were used as a minimum unit of application of the same amount of thermal energy. A white portion corresponds to "small thermal energy" (corresponding to a raised portion in the image protecting layer 15f), while a black portion corresponds to "large thermal energy" (corresponding to a recessed portion in the image protecting layer 15f). The assignment of thermal energy was made such that an area ratio between portions corresponding to "small thermal energy" and "large thermal energy" was 5:5. The heating element groups 18e, each including a plurality of heating elements 18c to which the same amount of thermal energy is applied, were randomly arranged. Here, one pixel represents the state of thermal energy of one heating element 18c. By repeating the above-described process 36 times and binding the generated data together in the column direction (printing direction), a random uneven pattern of FIG. 7 was produced. The uneven pattern measures about 3 mm by about 3 mm on the printing medium 14.

From the random pattern generated as described above, A4-size image data was generated by a personal computer (hereinafter referred to as computer) having Windows (registered trademark) XP as the operating system, using command and pattern maker features of software (Adobe Photoshop 7.0) produced by Adobe Systems Incorporated. Then, the generated image data was used as uneven-pattern data.

The computer was used to transmit the generated image data to the printer apparatus described above. This computer and the printer apparatus were connected to each other via a USB cable. Software (Adobe Photoshop) produced by Adobe Systems Incorporated was used to generate black solid image data on the computer. The black solid image data was transmitted to the printer apparatus. Then, the corresponding black solid image was printed at a printing speed of 4 msec/line, using an ink ribbon serving as the thermal transfer sheet 15 and the printing medium 14 (UPC-747 (A4+ size polypropylene (PP) base) produced by Sony Corporation). Then, according to the generated uneven-pattern data and at a printing speed of 8 msec/line during thermal transfer, the image protecting layer 15f was thermally transferred onto the black solid image by applying thermal energy for yellow (R, G, B)=(255, 255, 0) to heating elements corresponding to "large thermal energy" and applying thermal energy for yellow (R, G, B)=(255, 255, 100) to heating elements corresponding to "small thermal energy". Thus, the black solid image was laminated with the image protecting layer 15f.

Embodiment 2

Uneven-pattern data was generated and printing was performed in the same manner as that of Embodiment 1, except that, in a 1-row by 36-column array of pixels, the random assignment of thermal energy was made using 3 adjacent pixels in a row as a minimum unit of application of the same amount of thermal energy.

Embodiment 3

Uneven-pattern data was generated and printing was performed in the same manner as that of Embodiment 1, except that, in a 2-row by 36-column array of pixels, the random assignment of thermal energy was made using a 2-row by 2-column array of pixels as a minimum unit of application of the same amount of thermal energy, the random assignment was repeated 18 times and the generated data was bound together in the column direction (printing direction), and thus a basic uneven pattern measuring about 3 mm by about 3 mm was formed on the printing paper.

Embodiment 4

Uneven-pattern data was generated and printing was performed in the same manner as that of Embodiment 1, except that, in a 3-row by 36-column array of pixels, the random assignment of thermal energy was made using a 3-row by 2-column array of pixels as a minimum unit of application of the same amount of thermal energy, the random assignment was repeated 12 times and the generated data was bound together in the column direction (printing direction), and thus a basic uneven pattern measuring about 3 mm by about 3 mm was formed on the printing paper.

Embodiment 5

Uneven-pattern data was generated and printing was performed in the same manner as that of Embodiment 2, except that the assignment of thermal energy was made such that an area ratio between portions corresponding to "large thermal energy" and "small thermal energy" was 3:7.

Embodiment 6

Uneven-pattern data was generated and printing was performed in the same manner as that of Embodiment 2, except that the assignment of thermal energy was made such that an area ratio between portions corresponding to "large thermal energy" and "small thermal energy" was 4:6.

Embodiment 7

Uneven-pattern data was generated and printing was performed in the same manner as that of Embodiment 2, except that the assignment of thermal energy was made such that an area ratio between portions corresponding to "large thermal energy" and "small thermal energy" was 6:4.

Embodiment 8

Uneven-pattern data was generated and printing was performed in the same manner as that of Embodiment 2, except that the assignment of thermal energy was made such that an area ratio between portions corresponding to "large thermal energy" and "small thermal energy" was 7:3.

Comparative Example 1

Uneven-pattern data was generated and printing was performed in the same manner as that of Embodiment 1, except that, in a 1-row by 36-column array of pixels, the random assignment of thermal energy was made using 1 pixel as a minimum unit of application of the same amount of thermal energy.

Comparative Example 2

Uneven-pattern data was generated and printing was performed in the same manner as that of Embodiment 1, except that, in a 2-row by 36-column array of pixels, the random assignment of thermal energy was made using a 2-row by 1-column array of pixels as a minimum unit of application of the same amount of thermal energy, the random assignment was repeated 18 times and the generated data was bound together in the column direction (printing direction), and thus a basic uneven pattern measuring about 3 mm by about 3 mm was formed on the printing paper.

Comparative Example 3

Uneven-pattern data was generated and printing was performed in the same manner as that of Embodiment 1, except that, in a 3-row by 36-column array of pixels, the random assignment of thermal energy was made using a 3-row by 1-column array of pixels as a minimum unit of application of the same amount of thermal energy, the random assignment was repeated 12 times and the generated data was bound together in the column direction (printing direction), and thus a basic uneven pattern measuring about 3 mm by about 3 mm was formed on the printing paper.

Evaluation

Reproducibility of Uneven Pattern

The reproducibility of an uneven pattern formed on the surface of the image protecting layer 15f with which the printing medium 14 was laminated was checked using a 10× objective lens of an optical microscope produced by Olympus Corporation. The reproducibility of the uneven pattern formed on the image protecting layer 15f in each of the embodiments and comparative examples was evaluated according to the following three scales:

A: The generated printing pattern was exactly reproduced, and boundaries between two different levels of thermal energy were clearly identifiable;

B: The generated printing pattern was almost exactly reproduced, and boundaries between two different levels of thermal energy were identifiable; and C: The generated printing pattern was poorly or not at all reproduced, and boundaries between two different levels of thermal energy were not identifiable.

(Print Evaluation Based on Visual Observation)

As an example of a recorded image having a glossy textured surface similar to that of a silver halide photograph, a photographic image on Royal and Edge Paper produced by Eastman Kodak Company was used. In comparison with this photographic image, the glossiness and surface texture of a recorded image produced in each of the embodiments and comparative examples were evaluated by visual observation, according to the following four scales:

A: Excellent. The recorded image had a glossy textured surface equivalent to that of a silver halide photograph.

B: Very good. The recorded image had a glossy textured surface almost equivalent to that of a silver halide photograph.

C: Good. The recorded image had a surface glossier or more matte than that of a silver halide photograph, but the surface texture was observable.

D: Poor. The recorded image had a surface excessively glossier than that of a silver halide photograph or had an entirely matte surface, and the surface texture was hardly observable.

The reproducibility of each uneven pattern and the corresponding result of print evaluation based on visual observation are shown in Table 1.

TABLE 1

| | Minimum Size of Heating Element Group (The Number of Consecutive Heating Elements) | | Area Ratio in Uneven pattern | | Result of Print Evaluation |
|---|---|---|---|---|---|
| | Direction of Arrangement of Heating Elements | Printing Direction | (Recessed Portion:Raised Portion) | Reproducibility of Uneven Pattern | Based on Visual Observation |
| Embodiment 1 | 2 | 1 | 5:5 | B | B |
| Embodiment 2 | 3 | 1 | 5:5 | B | B |
| Embodiment 3 | 2 | 2 | 5:5 | A | A |
| Embodiment 4 | 3 | 2 | 5:5 | A | A |
| Embodiment 5 | 2 | 2 | 3:7 | A | C |
| Embodiment 6 | 2 | 2 | 4:6 | A | B |
| Embodiment 7 | 2 | 2 | 6:4 | A | B |
| Embodiment 8 | 2 | 2 | 7:3 | A | C |
| Comparative Example 1 | 1 | 1 | 5:5 | C | D |
| Comparative Example 2 | 1 | 2 | 5:5 | C | D |
| Comparative Example 3 | 1 | 3 | 5:5 | C | D |

Table 1 shows that the results of print evaluation based on visual observation are good in Embodiments 1 to 8. That is, to improve the reproducibility of an uneven pattern and achieve a good result of print evaluation based on visual observation, it is necessary to use a heating element group 18e including at least two heating elements 18c in a row direction (in the direction of arrangement of heating elements 18c) as a minimum unit to form an uneven pattern on the image protecting layer 15f. In particular, if each heating element group 18e includes at least two heating elements 18c in a row, the same amount of thermal energy is applied to each heating element 18c in at least two adjacent printing lines in the conveyance direction of the printing medium 14, and an area ratio between a recessed portion and a raised portion in the uneven pattern is 5:5, a good result of print evaluation based on visual observation can be obtained (Embodiments 3 and 4).

Figure 8:
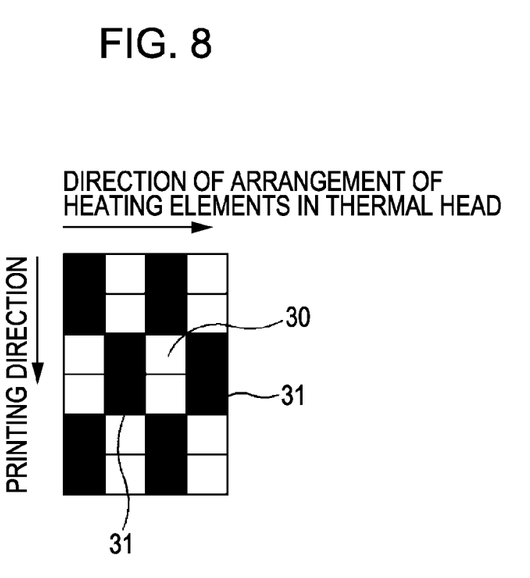
FIG. 8 illustrates an uneven pattern of Comparative Example 2.

FIG. 8 illustrates an uneven pattern obtained in Comparative Example 2, where a g-row by 1-column array of pixels was used as a minimum unit of application of the same amount of thermal energy. A white portion corresponds to "small thermal energy" (corresponding to a raised portion in the image protecting layer 15f), while a black portion corresponds to "large thermal energy" (corresponding to a recessed portion in the image protecting layer 15f). As described above, in Comparative Example 2, a 2-row by 1-column array of pixels was used as a minimum unit of application of the same amount of thermal energy. This minimum unit is obtained by changing places between rows and columns of that in the case of Embodiment 1. However, in Comparative Example 2, the reproducibility of the uneven pattern and the result of print evaluation based on visual observation were not good. The reason will be described below.

As illustrated in FIG. 8, when a 2-row by 1-column array of pixels is used as a minimum unit of application of the same amount of thermal energy, second regions 31 and 31, each being composed of a 2-row by 1-column array of pixels and corresponding to a recessed portion formed by application of "large thermal energy", may be formed on both sides of a first region 30 composed of a 2-row by 1-column array of pixels and corresponding to a raised portion formed by application of "small thermal energy". In this case, a raised portion in the first region 30 is not clearly formed due to the effect of thermal energy applied to the second regions 31 and 31 on both sides of the first region 30. That is, the surface of the raised portion in the first region 30 becomes rough and matte. Therefore, in Comparative Example 2, the reproducibility of the uneven pattern and the result of print evaluation based on visual observation were not good.

It should be understood by those skilled in the art that various modifications, combinations, sub-combinations and alterations may occur depending on design requirements and other factors insofar as they are within the scope of the appended claims or the equivalents thereof.

What is claimed is:

1. A method, comprising:
   transferring an image protecting layer onto an image formed on a printing medium by thermal transfer using a thermal head having a plurality of heating elements, transferring of the image protecting layer including forming an uneven pattern on the image protecting layer by:
   (i) randomly dividing, for each printing line of the printing medium, a row of the heating elements in the thermal head into a plurality of heating element groups each including at least two adjacent heating elements, the row of the heating elements extending in a direction orthogonal to a conveyance direction in which the printing medium is conveyed,
(ii) applying the same amount of energy to heating elements included in the same heating element group; and
(iii) applying different amounts of energy to respective adjacent heating element groups, wherein,
the same amount of energy is applied to each of at least two heating elements in at least two adjacent printing lines, the at least two adjacent printing lines extending in the conveyance direction in which the printing medium is conveyed, and
two different amounts of energy are applied to the respective adjacent heating element groups such that a first amount of energy is applied to heating elements in a first heating element group and a second amount of energy different from the first amount of energy is applied to heating elements in a second heating element group that is adjacent to the first heating element group.

2. The method according to claim 1, wherein:
when the first amount of energy is applied to the heating elements in the first heating element group, a recessed portion is formed in the image protecting layer,
when the second amount of energy is applied to the heating elements in the second heating element group, a raised portion is formed in the image protecting layer, and
in the uneven pattern formed on the image protecting layer, an area ratio between the recessed portion formed by the application of the first amount of energy and the raised portion formed by the application of the second amount of energy is in a range of 4:6 to 6:4.

* * * * *